United States Patent Office 3,123,599
Patented Mar. 3, 1964

3,123,599
16,17-EPITHIOSTEROID
Taichiro Komeno, Sumiyoshi-ku, Osaka-shi, Japan, assignor to Shionogi & Co., Ltd., Osaka, Japan
No Drawing. Filed Aug. 10, 1962, Ser. No. 216,057
Claims priority, application Japan Aug. 30, 1961
19 Claims. (Cl. 260—239.5)

This invention relates to 16,17-epithiosteroids, and more particularly to 16,17-epithioandrostanes and production thereof.

It is an object of the present invention to embody 16,17-epithioandrostanes. Another object is to embody androstanes having pharmacological activities. A further object is to embody a process for converting 16,17-epoxy-androstanes into 16,17-epithioandrostanes. These and other objects will be apparent to those skilled in the art to which this invention pertains from the following description of the general class of compounds and certain specific examples of particular members as well as general and specific methods for their production.

The starting materials of the present invention are 16,17-epoxyandrostanes, i.e. 16α,17α-epoxyandrostanes and 16β,17β-epoxyandrostanes, having the following partial formula:

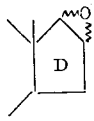

wherein the ripple mark ($) represents α- or β-configuration. The 16,17-epoxyandrostanes include, for instance, the steroids having the following specific formula:

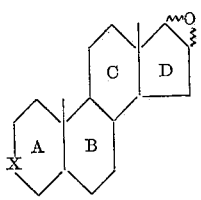

wherein X is α-hydroxymethylene, β-hydroxymethylene, α-lower alkanoyloxymethylene (e.g. α-acetyloxymethylene, α-propionyloxymethylene, α-butyroyloxymethylene, α-pentanoyloxymethylene), β-lower alkanoyloxymethylene (e.g. β-acetyloxymethylene, β-propionyloxymethylene, β-butyroyloxymethylene, β-pentanoyloxymethylene), carbonyl or lower alkylenedioxymethylene (e.g. ethylenedioxymethylene, trimethylenedioxymethylene), not more than two double bonds may exist in A and/or B ring and the ripple mark ($) represents α- or β-configuration. More specifically, the 16,17- epoxyandrostanes may be exampled as follows: 3α-hydroxy-16α,17α-epoxy-5β-androstane, 3β-hydroxy-16α,17α-epoxy-5α-androstane, 3α-acetyloxy-16α,17α-epoxy-5β-androstane, 3α-propionyloxy-16α,17α-epoxy-5β-androstane, 3β-butyroyloxy-16α,17α-epoxy-5α-androstane, 3-oxo-16α,17α-epoxy-5α-androstane, 3-oxo-16α,17α-epoxy-5α-androstane, 3-oxo-16α,17α-epoxy-4-androstene, 3-oxo-16α,17α-epoxy-1,4-androstadiene, 3-oxo-16α,17α-epoxy-4,6-androstadiene, 3,3-ethylenedioxy-16α,17α-epoxy-4,6-androstadiene, 3,3-ethylenedioxy-16α,17α-epoxy-5α-androstane, 3,3-ethylenedioxy-16α,17α-epoxy-5(6)-androstene, 3,3-ethylenedioxy-16α,17α-epoxy-5(6),7-androstadiene, 3α-hydroxy-16β,17β-epoxy-5β-androstane, 3β-hydroxy-16β,17β-epoxy-5α-androstane, 3α-propionyloxy-16β,17β-epoxy-5β-androstane, 3α-acetyloxy-16β,17β-epoxy-5β-androstane, 3β-butyroyloxy-16β,17β-epoxy-5α-androstane, 3-oxo-16β,17β-epoxy-5α-androstane, 3-oxo-16β,17β-epoxy-5β-androstane, 3-oxo-16β,17β-epoxy-4-androstane, 3-oxo-16β,17β-epoxy-1,4-androstadiene, 3 - oxo - 16β,17β - epoxy - 4,6 - androstadiene, 3,3-ethylenedioxy-16β,17β-epoxy-5α-androstane, 3,3-ethylenedioxy-16β,17β-epoxy-5(6)-androstene, 3,3-ethylenedioxy-16β,17β-epoxy-5(6),7-androstadiene, etc. The other 16,17-epoxyandrostanes may be, of course, equally employed as the starting material. Thus, the following steroids are additionally exampled: 3α,11β-dihydroxy-16α,17α-epoxy-5β-androstane, 3β-hydroxy-11-oxo-16α,17α-epoxy-5α-androstane, 3,11-dioxo-16α,17α-epoxy-5α-androstane, 3-oxo-11β-hydroxy-16α,17α-epoxy-4-androstene, 3-oxo-11β-hydroxy-16α,17α-epoxy-1,4-androstadiene, 3,11-dioxo-16α,17α-epoxy-4-androstene, 3,11-dioxo-16α,17α-epoxy-1,4-androstadiene, 16α,17α-epoxy-5α-androstane, 3β,11β-dihydroxy-16β,17β-epoxy-5β-androstane, 3β-hydroxy-11-oxo-16β,17β-epoxy-5α-androstane, 3,11-dioxo-16β,17β-epoxy-5α-androstane, 3-oxo-11β-hydroxy-16β,17β-epoxy-4-androstene, 3-oxo-11β-hydroxy-16β,17β-epoxy-1,4-androstadiene, 3,11-dioxo-16β,17β-epoxy-4-androstene, 3,11-dioxo-16β,17β-epoxy-1,4-androstadiene, 16β,17β-epoxy-5α-androstane, etc.

The conversion of 16,17-epoxyandrostanes into 16,17-epithioandrostanes can be accomplished substantially by three steps represented by the following partial formula:

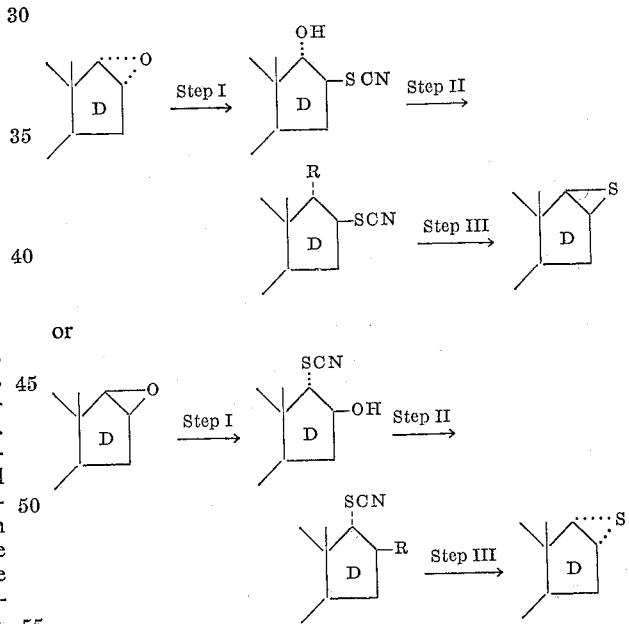

wherein R is an acid radical such as halogen (e.g. chlorine, bromine), lower alkanoyloxy (e.g. acetyloxy, propionyloxy, butyroyloxy, pentanoyloxy), benzoyloxy, lower alkanesulfonyloxy (e.g. methanesulfonyloxy, ethanesulfonyloxy), benzenesulfonyloxy and lower alkylbenzenesulfonyloxy (e.g. toluenesulfonyloxy, xylenesulfonyloxy). Of these steps, the first step per se has been disclosed in U.S. Patent No. 2,982,777 and is not included in the present invention. However, the step will be hereinafter illustrated for convenience as well as the other two steps. When any radical of the starting 16,17-epoxyandrostane is undesirably affected by the reagent employed in any step, such radical is required to be protected in a conventional manner prior to the execution of the reaction in such step. However, whether the protection is needed will be obvious to those skilled in the art.

In the first step, the 16,17-epoxyandrostanes are subjected to the fission of epoxy linkage with thiocyanic acid. The reaction may be carried out by introducing thiocyanic acid gas produced by a conventional method [H. Buck et al.: Z. anorg. Chem., 77, 51 (1912)] into a solution of the 16,17-epoxyandrostane in a suitable solvent (e.g. benzene, carbon disulfide, dichloromethane, chloroform, carbon tetrachloride, ether) or adding the 16,17-epoxyandrostane to a solution of thiocyanic acid prepared in advance by shaking a salt of thiocyanic acid (e.g. sodium thiocyanate, potassium thiocyanate) with an acid (e.g. phosphoric acid) in a suitable solvent (e.g. benzene, carbon disulfide, dichloromethane, chloroform, carbon tetrachloride, ether, dioxane), followed by allowing the resultant mixture to stand at room temperature (10 to 25° C.) or heating the same on a water-bath. Generally speaking, it takes a relatively long time for completion of the reaction and, therefore, excess of thiocyanic acid may be preferably employed.

In the second step, the resulting thiocyanatohydrines are subjected to the acylation with an organic or inorganic acylating agent such as halogenating agent (e.g. thionyl chloride, thionyl bromide, phosphorus oxychloride, phosphorus trichloride, phosphorus tribromide, phosphorus pentachloride), lower alkanoylating agent (e.g. acetyl chloride, propionyl chloride), benzoylating agent (e.g. benzoyl chloride, benzoyl bromide), lower alkanesulfonylating agent (e.g. methanesulfonyl chloride, ethanesulfonyl chloride), benzenesulfonylating agent (e.g. benzenesulfonyl chloride, benzenesulfonyl bromide) and lower alkylbenzenesulfonylating agent (e.g. toluenesulfonyl chloride, xylenesulfonyl chloride). Although any of the said acylating agents can be equally well employed, the use of lower alkanesulfonylating agent or lower alkylbenzenesulfonylating agent is preferred. When these preferred agents are employed, the reaction can be accomplished by treating the thiocyanatohydrine with the acylating agent in the presence of a condensing agent (e.g. pyridine, picoline, triethylamine) at room temperature (10 to 25° C.) or while ice-cooling.

In the third step, the resulting acylated thiocyanatohydrines are subjected to the formation of epithio linkage with a basic agent. As the basic agent, there may be employed alkali metal hydroxide (e.g. sodium hydroxide, potassium hydroxide), alkaline earth metal hydroxide (e.g. calcium hydroxide, barium hydroxide), alkali metal hydride (e.g. lithium aluminum hydride, lithium borohydride, sodium borohydride) and the like. The reaction can be performed by heating the acylated thiocyanatohydrine with the said basic agent in a suitable solvent (e.g. methanol, ethanol, ether, tetrahydrofuran, dioxane), if necessary, while refluxing. Although the reaction can proceed at room temperature (10 to 25° C.), it takes usually a long time for completion of the reaction.

The final products are the 16,17-epithioandrostanes, i.e. 16α,17α-epithioandrostanes and 16β,17β-epithioandrostanes, having the following partial formula:

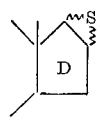

wherein the ripple mark ($\wr$) represents α- or β-configuration. The 16,17-epithioandrostanes include, for instance, the steroids having the following specific formula:

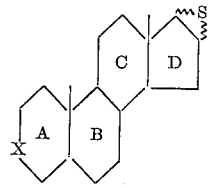

wherein X has the same significance as designated above, not more than two double bonds may exist in A and/or B ring, and the ripple mark ($\wr$) represents α- or β-configuration. More specifically, the 16,17-epithioandrostanes may be exampled as follows:

3α-hydroxy-16β,17β-epithio-5β-androstane,
3β-hydroxy-16β,17β-epithio-5α-androstane,
3α-acetyloxy-16β,17β-epithio-5β-androstane,
3α-propionyloxy-16β,17β-epithio-5β-androstane,
3β-butyroyloxy-16β,17β-epithio-5α-androstane,
3-oxo-16β,17β-epithio-5α-androstane,
3-oxo-16β,17β-epithio-5β-androstane,
3-oxo-16β,17β-epithio-4-androstene,
3-oxo-16β,17β-epithio-1,4-androstadiene,
3-oxo-16β,17β-epithio-4,6-androstadiene,
3,3-ethylenedioxy-16β,17β-epithio-5α-androstane,
3,3-ethylenedioxy-16β,17β-epithio-5(6)-androstene,
3,3-ethylenedioxy-16β,17β-epithio-5(6),7-androstadiene,
3α-hydroxy-16α,17α-epithio-5β-androstane,
3β-hydroxy-16α,17α-epithio-5α-androstane,
3α-acetyloxy-16α,17α-epithio-5β-androstane,
3α-propionyloxy-16α,17α-epithio-5β-androstane,
3β-butyroyloxy-16α,17α-epithio-5α-androstane,
3-oxo-16α,17α-epithio-5α-androstane,
3-oxo-16α,17α-epithio-5β-androstane,
3-oxo-16α,17α-epithio-4-androstene,
3-oxo-16α,17α-epithio-1,4-androstadiene,
3-oxo-16α,17α-epithio-4,6-androstadiene,
3,3-ethylenedioxy-16α,17α-epithio-5α-androstane,
3,3-ethylenedioxy-16α,17α-epithio-5(6)-androstene,
3,3-ethylenedioxy-16α,17α-epithio-5(6),7-androstadiene, etc.

There may be also obtained the other 16,17-epithioandrostanes corresponding to the starting 16,17-epoxyandrostanes, provided that the configuration of the epoxy group is reversed. Thus, the following steroids may be additionally exampled:

3α,11β-dihydroxy-16β,17β-epithio-5β-androstane,
3β-hydroxy-11-oxo-16β,17β-epithio-5α-androstane,
3,11-dioxo-16β,17β-epithio-4-androstene,
3-oxo-11β-hydroxy-16β,17β-epithio-1,4-androstadiene,
3,11-dioxo-16β,17β-epithio-4-androstene,
3,11-dioxo-16β,17β-epithio-1,4-androstadiene,
16β,17β-epithio-5α-androstane,
3β,11β-dihydroxy-16α,17α-epithio-5β-androstane,
3β-hydroxy-11-oxo-16α,17α-epithio-5α-androstane,
3,11-dioxo-16α,17α-epithio-5α-androstane,
3-oxo-11β-hydroxy-16α,17α-epithio-4-androstene,
3-oxo-11β-hydroxy-16α,17α-epithio-1,4-androstadiene,
3,11-dioxo-16α,17α-epithio-4-androstene,
3,11-dioxo-16α,17α-epithio-1,4-androstadiene,
16α,17α-epithio-5α-androstane, etc.

These 16,17-epithioandrostanes are characterized by showing anti-DOCA (desoxycorticosterone acetate) activity in general. For instance, 3-oxo-16β,17β-epithio-4-androstene, 3-oxo-16β,17β-epithio-1,4-androstadiene, 3-oxo-16β,17β-epithio-4,6-androstadiene and 3β-hydroxy-16β,17β-epithio-5α-androstane each shows the significant inhibition of the response caused by 10 micrograms of DOCA, when administered subcutaneously at a dose of 5 milligrams or less per rat weighing from 140 to 160 grams. Thus, the 16,17-epithioandrostanes are useful as anti-DOCA agents.

The following examples set forth illustratively presently-preferred embodiments of the invention.

In the examples the abbreviations have the following significances: mg. milligram(s); g., gram(s); ml., millilitre(s); Anal. Calcd., analysis calculated; and ° C., degrees centigrade. Other abbreviations have conventional significances.

Example 1

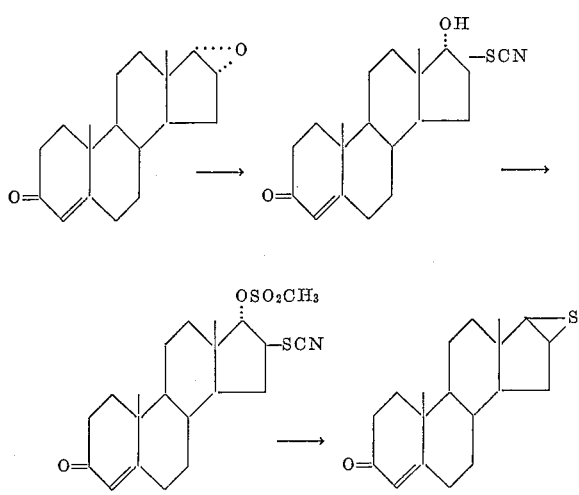

To an ethereal solution of thiocyanic acid prepared from potassium thiocyanate (45 g.), phosphoric acid (45 g.) and ether (150 ml.), there is added 3-oxo-16α,17α-epoxy-4-androstene [H. Heusser et al.: Helv. Chim. Acta, 33, 2242 (1950)] (4.15 g.), and the resultant solution is allowed to stand overnight at room temperature (15 to 20° C.). The reaction mixture is washed with water, 10% sodium carbonate and water in turn, and dried over anhydrous sodium sulfate. Removing the ether, the residue is dissolved in acetone (100 ml.), treated with decolorizing carbon and then concentrated to give 3-oxo-16β-thiocyanato-17α-hydroxy-4-androstene (3.88 g.) as cubic crystals melting at 190 to 192° C. (decomp.).

$[\alpha]_D^{29}+48.2\pm2°$ (c.=1.056 CHCl$_3$).

Anal. Calcd. for $C_{20}H_{27}O_2NS$: C, 69.53; H, 7.88; N, 4.05; S, 9.28. Found: C, 69.30; H, 7.90; N, 4.31; S, 9.18.

To a solution of 3-oxo-16β-thiocyanato-17α-hydroxy-4-androstene (2.908 g.) in pyridine (24 ml.), there is gradually added methanesulfonyl chloride (3.0 g.) while cooling at 0° C., and the resultant solution is allowed to stand overnight at the same temperature. The reaction mixture is mixed with ice-water (30 ml.) and shaken with benzene. The benzene extract is washed with 10% hydrochloric acid, water, 10% sodium carbonate and water in turn, and dried over anhydrous sodium sulfate. The solvent is removed to give crude 3-oxo-16β-thiocyanato-17α-methanesulfonyloxy-4-androstene (3.56 g.) as a yellow viscous substance.

To a solution of the above-prepared crude 3-oxo-16β-thiocyanato-17α-methanesulfonyloxy-4-androstene (3.56 g.) in tetrahydrofuran (10 ml.), there is added a solution of potassium hydroxide (4 g.) in ethanol (40 ml.) while boiling in nitrogen stream, and the resultant solution is boiled for 2 hours in nitrogen stream. After cooling, the reaction mixture is mixed with water and shaken with benzene. The benzene extract is washed with water, dried over anhydrous sodium sulfate and concentrated to give the residue (2.735 g.), which is crystallized from ether to give 3-oxo-16β, 17β-epithio-4-androstene (2.012 g.) as crude crystals.

Example 2

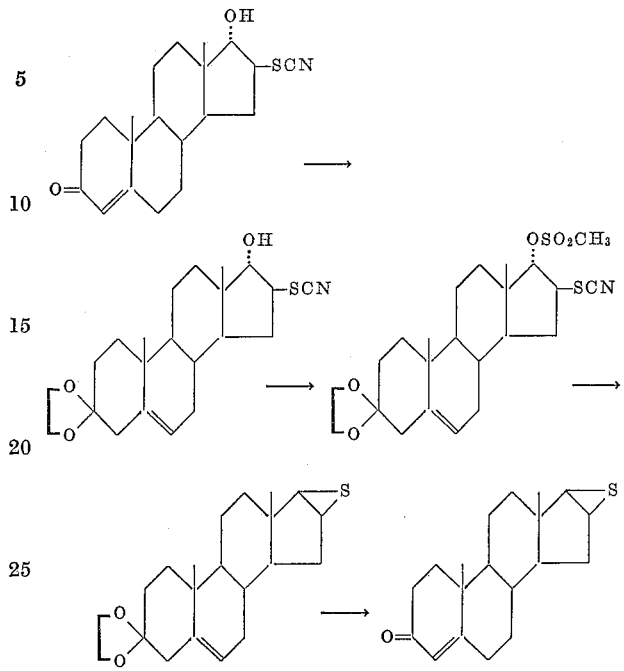

A mixture of 3-oxo-16β-thiocyanato-17α-hydroxy-4-androstene (5.65 g.) prepared as in Example 1, ethyleneglycol (400 ml.) and p-toluenesulfonic acid (300 mg.) is gradually distilled at a temperature between 72 and 73° C. under 3 mm. Hg, whereby the crystals of the starting material are gradually dissolved and the fine needles crystallized out. The reaction mixture is concentrated to about ¼ volume in 4 hours. The concentrate is cooled, mixed with sodium carbonate and water, and filtered. The collected crystals are washed with water, dried and recrystallized from methanol to give 3,3-ethylene-dioxy-16β-thiocyanato-17α-hydroxy-5-androstene (5.50 g.) as crystals melting at 190 to 192° C. (decomp.).

$[\alpha]_D^{28}-65.4\pm2°$ (c.=0.981 CHCl$_3$).

Anal. Calcd. for $C_{22}H_{31}O_3NS$: C, 67.83; H, 8.02; N, 3.60; S, 8.23. Found: C, 67.97; H, 8.08; N, 3.41; S, 8.28.

To a solution of 3,3-ethylenedioxy-16β-thiocyanato-17α-hydroxy-5-androstene (1.582 g.) in pyridine (35 ml.), there is added methanesulfonyl chloride (2.2 g.) while ice-cooling, and the resultant solution is allowed to stand for 2 hours while ice-cooling and then overnight at room temperature (15 to 20° C.). Adding ice-water to the reaction mixture, the precipitate is collected by filtration and dried to give the solid (1.810 g.), which is crystallized from a mixture of dichloromethane and acetone to give 3,3-ethylenedioxy-16β-thiocyanato - 17α-methanesulfonyloxy-5-androstene (1.604 g.) as needles melting at 189 to 190° C. (decomp.).

$[\alpha]_D^{21}-42.1\pm2°$ (c.=1.001 CHCl$_3$).

Anal. Calcd. for $C_{23}H_{33}O_5NS_2$: C, 59.07; H, 7.11; S, 13.71. Found: C, 59.17; H, 7.16; S, 13.46.

A solution of 3,3-ethylenedioxy-16β-thiocyanato-17α-methanesulfonyloxy-5-androstene (2.00 g.) in a mixture of potassium hydroxide (2 g.), methanol (20 ml.) and ethanol (20 ml.) is refluxed for 1 hour and concentrated to ½ volume. Adding water to the reaction mixture, the precipitate is collected by filtration, dried and crystallized from a mixture of dichloromethane and acetone to give 3,3-ethylenedioxy-16β,17β-epithio-5-androstene (1.263 g.) as needles melting at 202 to 204° C. (decomp.).

$[\alpha]_D^{23}+23.6\pm2°$ (c.=1.018 CHCl$_3$).

Anal. Calcd. for $C_{21}H_{30}O_2S$: C, 72.78; H, 8.73; S, 9.25. Found: C, 72.50; H, 8.73; S, 9.04.

A mixture of 3,3-ethylenedioxy-16β,17β-epithio-5-androstene (1.263 g.) in acetone (50 ml.) and p-toluenesulfonic acid (130 mg.) is refluxed for 1 hour. Adding water to the reaction mixture, the precipitate is collected by filtration and crystallized from a mixture of methanol and water to give 3-oxo-16β,17β-epithio-4-androstene (1.00 g.) as prisms melting at 171 to 173° C.

$[\alpha]_D^{28}+178.3\pm2°$ (c.=1.022 $CHCl_3$).

Anal. Calcd. for $C_{19}H_{26}OS$: C, 75.44; H, 8.66; S, 10.60. Found: C, 75.43; H, 8.73; S, 10.67.

*Example 3*

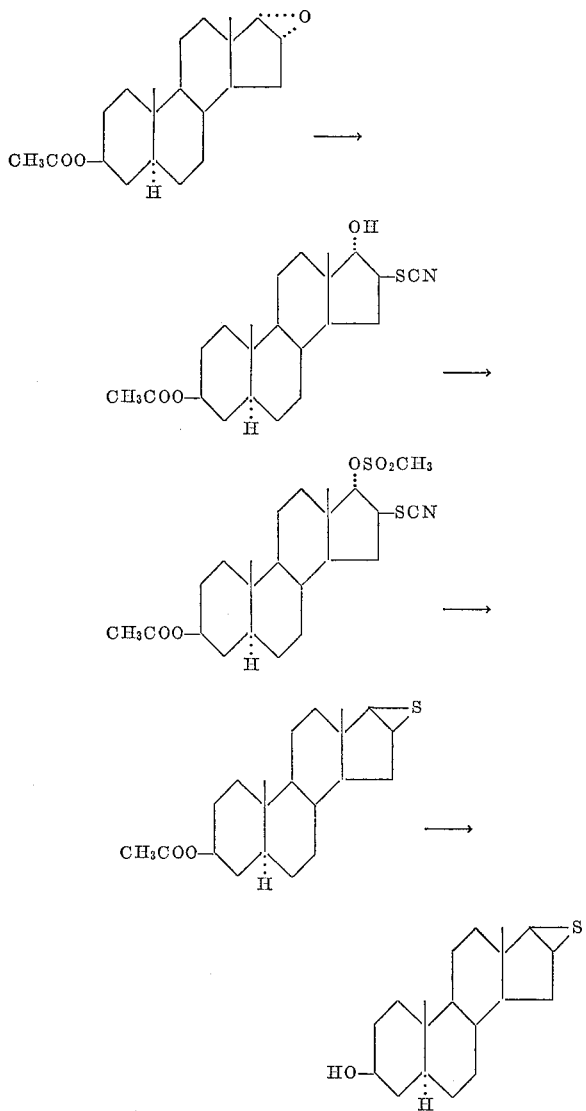

To an ethereal solution of thiocyanic acid prepared from potassium thiocyanate (30 g.), phosphoric acid (45 g.) and ether (150 ml.), there is added 3β-acetyloxy-16α,17α-epoxy-5α-androstane [J. Fajkoš et al.: Collection Czechoslov. Chem. Communs., 20, 312 (1955)] (5.00 g.), and the resultant solution is allowed to stand overnight at room temperature (15 to 20° C.). The reaction mixture is washed with water, 10% sodium carbonate and water in turn, and dried over anhydrous sodium sulfate. Removing the ether, the residue is crystallized from a mixture of acetone and hexane to give 3β-acetyloxy-16β-thiocyanato-17α-hydroxy-5α-androstane (5.32 g.) as pillars melting at 193 to 195° C.

$[\alpha]_D^{27}-27.8\pm2°$ (c.=1.054 $CHCl_3$).

Anal. Calcd. for $C_{22}H_{33}O_3NS$: C, 67.48; H, 8.50; N, 3.58; S, 8.19. Found: C, 67.64; H, 8.61; N, 3.57; S, 8.10.

To a solution of 3β-acetyloxy-16β-thiocyanato-17α-hydroxy-5α-androstane (5.12 g.) in pyridine (60 ml.), there is added methanesulfonyl chloride (5.1 g.), and the resultant solution is allowed to stand overnight in a refrigerator (0° C.). The reaction mixture is mixed with ice-water (50 ml.) and shaken with ether. The ether extract is washed with 10% hydrochloric acid, water, 10% sodium carbonate and water in turn, and dried over anhydrous sodium sulfate. Removing the solvent, the residue is crystallized from a mixture of ether and petroleum ether to give 3β-acetyloxy-16β-thiocyanato-17α-methanesulfonyloxy-5α-androstane (5.71 g.) as needles melting at 145 to 147° C. (decomp.).

$[\alpha]_D^{27}-4.0\pm2°$ (c.=0.999 $CHCl_3$).

Anal. Calcd. for $C_{23}H_{35}O_5NS_2$: C, 58.82; H, 7.51; N, 2.98; S, 13.66. Found: C, 58.93; H, 7.75; N, 2.79; S, 13.76.

To a solution of potassium hydroxide (5 g.) in 95% ethanol (50 ml.), there is added 3β-acetyloxy-16β-thiocyanato-17α-mehanesulfonyloxy-5α-androstane (5.25 g.), and the whole solidified is dissolved by adding water (15 ml.) 30 minutes thereafter. The resulting solution is refluxed for 1 hour, and then mixed with water (15 ml.).

The reaction mixture is shaken with dichloromethane. The dichloromethane extract is washed with water, dried over anhydrous sodium sulfate and the solvent removed. The residue is crystallized from methanol to give crude crystals (3.03 g.) melting at 110 to 120° C. The crude crystals are dissolved in pyridine (10 ml.) and acetic anhydride (5 ml.) and heated for 1 hour on a water bath. Treating the reaction mixture according to a conventional manner, the residue is chromatographed on alumina II (30 g.) and the eluate from a mixture of petroleum ether and benzene (1:1) is crystallized from a mixture of ether and methanol to give 3β-acetyloxy-16β,17β-epithio-5α-androstane (2.668 g.) as prisms melting at 135 to 137° C.

$[\alpha]_D^{27}+55.5\pm2°$ (c.=1.010 $CHCl_3$).

Anal. Calcd. for $C_{21}H_{32}O_2S$: C, 72.36; H, 9.25; S, 9.20. Found: C, 72.60; H, 9.35; S, 8.85.

To a solution of potassium carbonate (2.2 g.) in 80% methanol (50 ml.), there is added 3β-acetyloxy-16β,17β-epithio-5α-androstane (2.668 g.), and the resultant solution is refluxed for 2 hours. Adding water to the reaction mixture, the precipitate is collected by filtration, washed with water and recrystallized from a mixture of dichloromethane and methanol to give 3β-hydroxy-16β,17β-epithio-5α-androstane (2.06 g.) as scales melting at 146 to 148° C.

$[\alpha]_D^{25°}+75.7\pm2°$ (c.=1.064 $CHCl_3$).

Anal. Calcd. for $C_{19}H_{30}OS$: C, 74.45; H, 9.87; S, 10.46. Found: C, 74.30; H, 9.92; S, 10.38.

*Example 4*

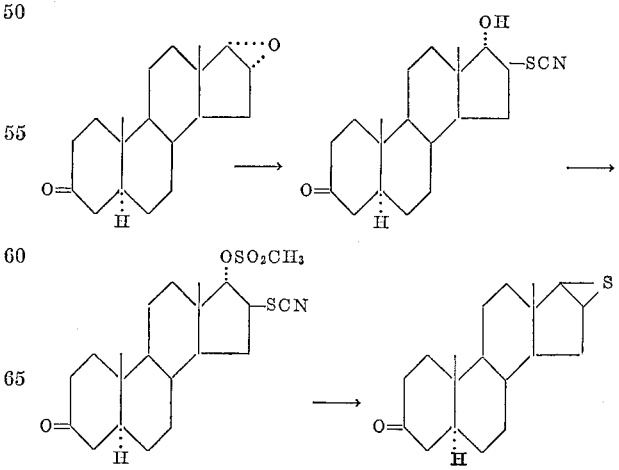

To an ethereal solution of thiocyanic acid prepared from potassium thiocyanate (11.5 g.), phosphoric acid (18.7 g.) and ether (70 ml.), there is added 3-oxo-16α,17α-epoxy-5α-androstane (1.795 g.), and the resultant solution is allowed to stand overnight at room temperature (15 to 20° C.). The reaction mixture is washed with water, 10% soduim carbonate solution and water in turn, and dried over anhydrous sodium sulfate. Removing the solvent, the residue is crystallized from a mixture of acetone and hexane to give 3-oxo-16β-thiocyanato-17α-hydroxy-5α-androstane (1.885 g.) as needles melting at 209 to 211° C.

$[\alpha]_D^{23°}$ —3.4±2° (c.=0.996 CHCl$_3$).

Anal. Calcd. for C$_{10}$H$_{29}$O$_2$NS: C, 69.12; H, 8.41; N, 4.03; S, 9.23. Found: C, 69.53; H, 8.36; N, 3.90; S, 9.15.

To a solution of 3-oxo-16β-thiocyanato-17α-hydroxy-5α-androstane (1.768 g.) in pyridine (30 ml.), there is added methanesulfonyl chloride (1.8 g.), and the resultant solution is allowed to stand overnight in a refrigerator (0° C.). Adding ice-water (20 ml.) to the reaction mixture, the resulting mixture is shaken with ether. The ether extract is washed with 10% hydrochloric acid, water, 10% sodium carbonate and water in turn and dried over anhydrous sodium sulfate. Removing the solvent, the residue is collected by filtration and crystallized from a mixture of acetone and hexane to give 3-oxo-16β-thiocyanato - 17α-methanesulfonyloxy-5α-androstane (1.879 g.) as needles melting at 134 to 135.5° C.

$[\alpha]_D^{23.5°}$ +18.0±2 (c.=1.002 CHCl$_3$).

Anal. Calcd. for C$_{21}$H$_{31}$O$_4$S$_2$N: C, 59.26; H, 7.34; N, 3.29; S, 15.07. Found: C, 59.33; H, 7.51; N, 3.20; S, 15.11.

To a solution of 3-oxo-16β-thiocyanato-17α-methanesulfonyloxy-5α-androstane (1.777 g.) in tertahydrofuran (30 ml.), there is added a solution of potassium hydroxide (3 g.) in a mixture of methanol (20 ml.) and ethanol (20 ml.), and the resultant solution is refluxed for 1 hour. The reaction mixture is mixed with water and shaken with dichloromethane. The dichloromethane extract is washed with water and dried over anhydrous sodium sulfate. Removing the solvent, the residue is chromatographed on alumina (20 g.). The eluate from a mixture of petroleum ether and benzene (1:1) is crystallized from ether and recrystallized from acetone to give 3-oxo-16β,17β-epithio-5α-androstane (403 mg.) as needles melting at 173 to 175° C. The mother liquor of crystallization is combined together with that of recrystallization and chromatographed an alumina (20 g.). The eluate from a mixture of petroleum ether and benzene (9:1) is crystallized from ether and recrystallized from acetone to give additional crystals (240 mg.) of 3-oxo-16β,17β-epithio-5α-androstane.

$[\alpha]_D^{23°}$ +101.6±2° (c.=1.019 CHCl$_3$).

Anal. Calcd. for C$_{19}$H$_{28}$OS: C, 74.94; H, 9.27; S, 10.53. Found: C, 74.90; H, 9.32; S, 10.49.

The starting material of this example, 3-oxo-16α-17α-epoxy-5α-androstane, is prepared by treating 3β-hydroxy-16α,17α-epoxy-5α-androstane [J. Fajkoš et al.: Collection Czechoslov. Chem. Communs., 20, 312 (1955)] with chromic acid in pyridine at room temperature.

*Example 5*

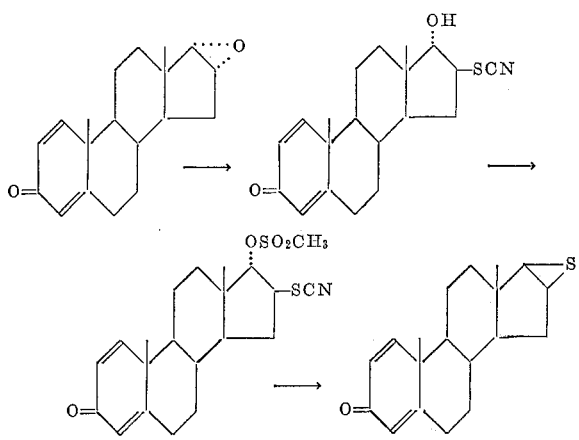

According to the same manner as disclosed in Example 1, 3-oxo-16α,17α-epoxy-1,4-androstadiene is converted into 3-oxo-16β,17β-epithio-1,4-androstadiene through 3-oxo-16β-thiocyanato-17α-hydroxy-1,4-androstadiene and 3 - oxo - 16β - thiocyanato - 17α - methanesulfonyloxy-1,4-androstadiene.

3-oxo-16β,17β-epithio-1,4-androstadiene is obtained as needles melting at 159 to 162° C.

$[\alpha]_D^{26}$ +97.4±2° (c.=1.031 CHCl$_3$).

Anal. Calcd. for C$_{19}$H$_{24}$OS: C, 75.95; H, 8.05; S, 10.67. Found: C, 75.85; H, 7.98; S, 10.92.

The starting material of this example, 3-oxo-16α,17α-epoxy-1,4-androstadiene, is prepared by refluxing 3-oxo-16α,17α-epoxy-4-androstene with DDQ (dichlorodicyano-p-benzoquinone) in benzene.

*Example 6*

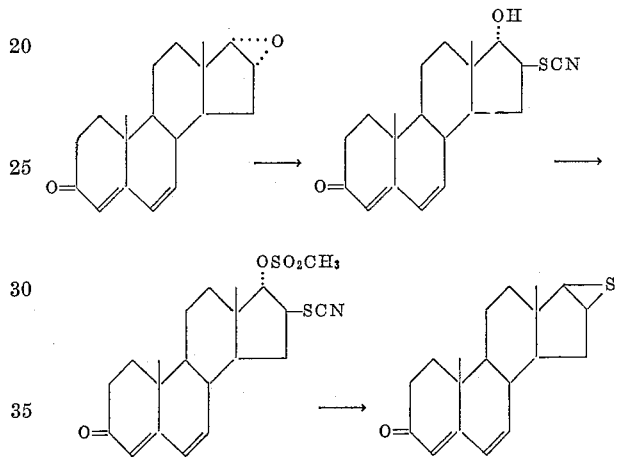

According to the same manner as described in Example 1, 3-oxo-16α,17α-epoxy-4,6-androstadiene is converted into 3 - oxo - 16β,17β-epithio-4,6-androstadiene through 3 - oxo-16β-thiocyanato-17α-hydroxy-4,6-androstadiene and 3-oxo-16β-thiocyanato-17α-methanesulfonyloxy-4,6-androstadiene.

3-oxo-16β,17β-epithio-4,6-androstadiene is obtained as prisms melting at 204 to 205° C.

$[\alpha]_D^{25}$ +158.6±2° (c.=1.088 CHCl$_3$).

Anal. Calcd. for C$_{19}$H$_{24}$OS: C, 75.95; H, 8.05; S, 10.67. Found: C, 76.11; H, 8.09; S, 10.79.

The starting material of this example, 3-oxo-16α,17α-epoxy-4,6-androstadiene, is prepared by refluxing 3-oxo-16α,17α-epoxy-4-androstene with chloranil (tetrachloro-p-benzoquinone) in t-butanol.

*Example 7*

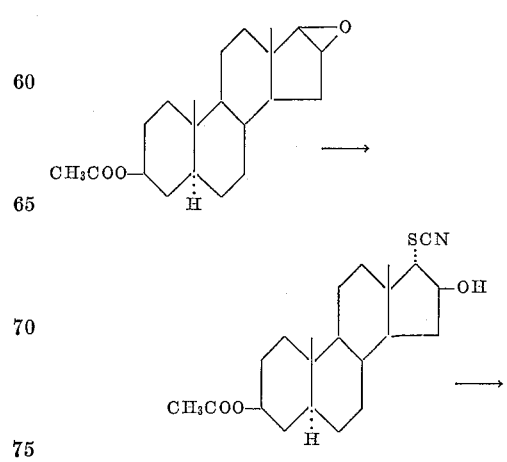

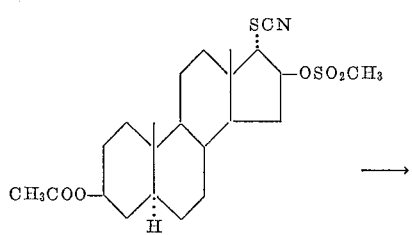

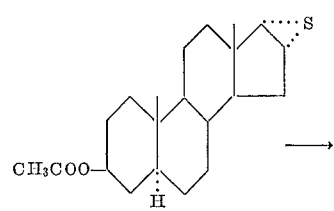

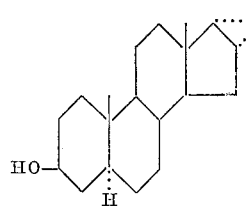

According to the same manner as described in Example 3, 3β-acetyloxy-16β,17β-epoxy-5α-androstane is converted into 3β-hydroxy-16α,17α-epithio-5α-androstane through 3β-acetyloxy-16β-hydroxy-17α-thiocyanato-5α-androstane, 3β - acetyloxy-16β-methanesulfonyloxy-17α-thiocyanato-5α-androstane and 3β-acetyloxy-16α,17α-epithio-5α-androstane.

3β-hydroxy-16α,17α-epithio-5α-androstane is obtained as crystals melting at 163 to 165° C.

Anal. Calc. for $C_{21}H_{32}O_2S$: C, 72.36; H, 9.35; S, 9.20. Found: C, 72.35; H, 9.25; S, 8.99.

The starting material of this example, 3β-acetyloxy-16β,17β-epoxy-5α-androstane, is prepared by refluxing 3β-hydroxy-16β,17β-epoxy-5α-androstane [J. Fajkoš et al.: Collection Czechoslov. Chem. Communs., 20, 312 (1955)] with acetic anhydride in pyridine.

What is claimed is:

1. A member selected from the group consisting of compounds of the formulae

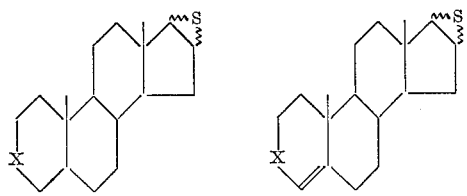

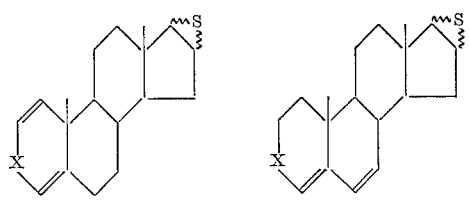

and

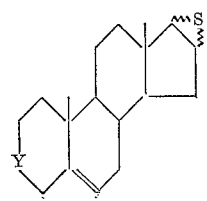

wherein X is a member selected from the group consisting of α-hydroxymethylene, β-hydroxymethylene, α-lower alkanoyloxy-methylene, β-lower alkanoyloxymethylene, carbonyl and lower alkylenedioxymethylene, X being lower alkylenedioxymethylene only when ring A is saturated, and Y is a member selected from the group consisting of α-hydroxymethylene, β-hydroxymethylene, α-lower alkanoyloxymethylene, β-lower alkanoyloxymethylene, and lower alkylenedioxymethylene.

2. 3-oxo-16β,17β-epithio-4-androstene.
3. 3,3-ethylenedioxy-16β,17β-epithio-5(6)-androstene.
4. 3β-acetyloxy-16β,17β-epithio-5α-androstane.
5. 3β-hydroxy-16β,17β-epithio-5α-androstane.
6. 3-oxo-16β,17β-epithio-5α-androstane.
7. 3-oxo-16β,17β-epithio-1,4-androstadiene.
8. 3-oxo-16β,17β-epithio-4,6-androstadiene.
9. 3β-acetyloxy-16α,17α-epithio-5α-androstane.
10. 3β-hydroxy-16α,17α-epithio-5α-androstane.
11. A member selected from the group consisting of compounds of the formulae

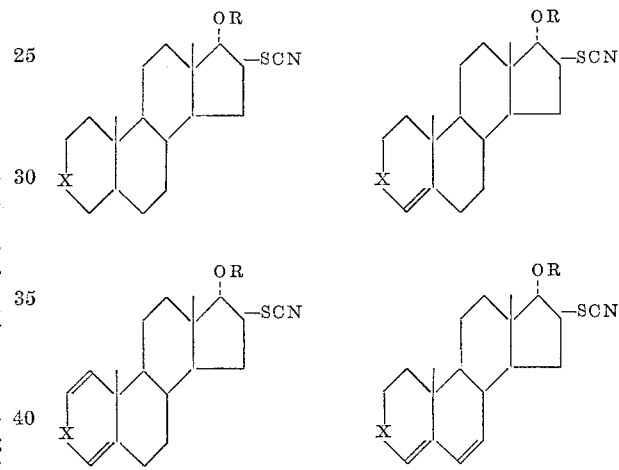

and

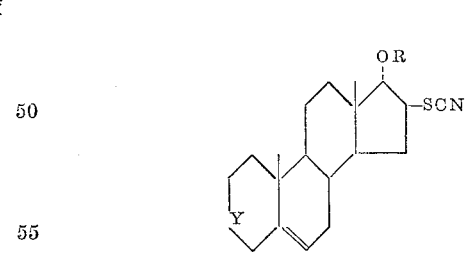

wherein X is a member selected from the group consisting of α-hydroxymethylene, β-hydroxymethylene, α-lower alkanoyloxymethylene, β-lower alkanoyloxymethylene, carbonyl and lower alkylenedioxymethylene, X being lower alkylenedioxymethylene only when ring A is saturated, Y is a member selected from the group consisting of α-hydroxymethylene, β-hydroxymethylene, α-lower alkanoyloxymethylene, β-lower alkanoyloxymethylene, and lower alkylenedioxymethylene, and R is a member selected from the group consisting of lower alkanesulfonyl and lower alkylbenzenesulfonyl.

12. 3 - oxo-16β-thiocyanato-17α-methanesulfonyloxy-4-androstene.

13. 3,3 - ethylenedioxy-16β-thiocyanato-17α-methanesulfonyloxy-5(6)-androstene.

14. 3β - acetyloxy - 16β-thiocyanato-17α-methanesulfonyloxy-5α-androstane.

15. 3 - oxo-16β-thiocyanato-17α-methanesulfonyloxy-5α-androstane.

16. 3 - oxo-16β-thiocyanato-17α-methanesulfonyloxy-1,4-androstadiene.

17. 3 - oxo-16β-thiocyanato-17α-methanesulfonyloxy-4,6-androstadiene.

18. A member selected from the group consisting of compounds of the formulae

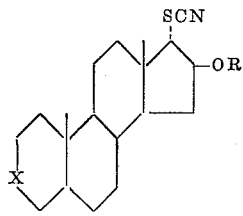 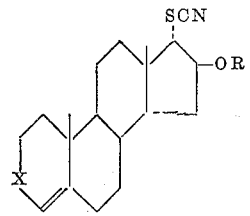

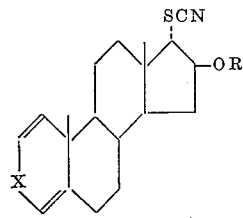 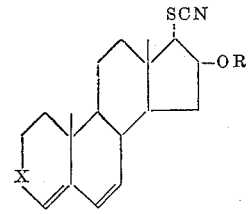

and

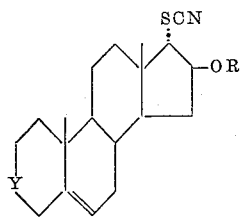

wherein X is a member selected from the group consisting of α-hydroxymethylene, β-hydroxymethylene, α-lower alkanoyloxymethylene, β-lower alkanoyloxymethylene, carbonyl and lower alkylenedioxymethylene, X being lower alkylenedioxymethylene only when ring A is saturated, Y is a member selected from the group consisting of α-hydroxymethylene, β-hydroxymethylene, α-lower alkanoyloxymethylene, β-lower alkanoyloxymethylene, and lower alkylenedioxymethylene, and R is a member selected from the group consisting of lower alkanesulfonyl and lower alkylbenzenesulfonyl.

19. 3β - acetyloxy-16β-methanesulfonyloxy-17α-thiocyanato-5α-androstane.

References Cited in the file of this patent
UNITED STATES PATENTS
2,982,777    Loechel et al. _____ May 2, 1961